No. 877,466. PATENTED JAN. 21, 1908.
W. H. MINER & J. F. O'CONNOR.
FRICTION SPRING DRAFT RIGGING FOR RAILWAY CARS.
APPLICATION FILED APR. 17, 1907.
2 SHEETS—SHEET 1.
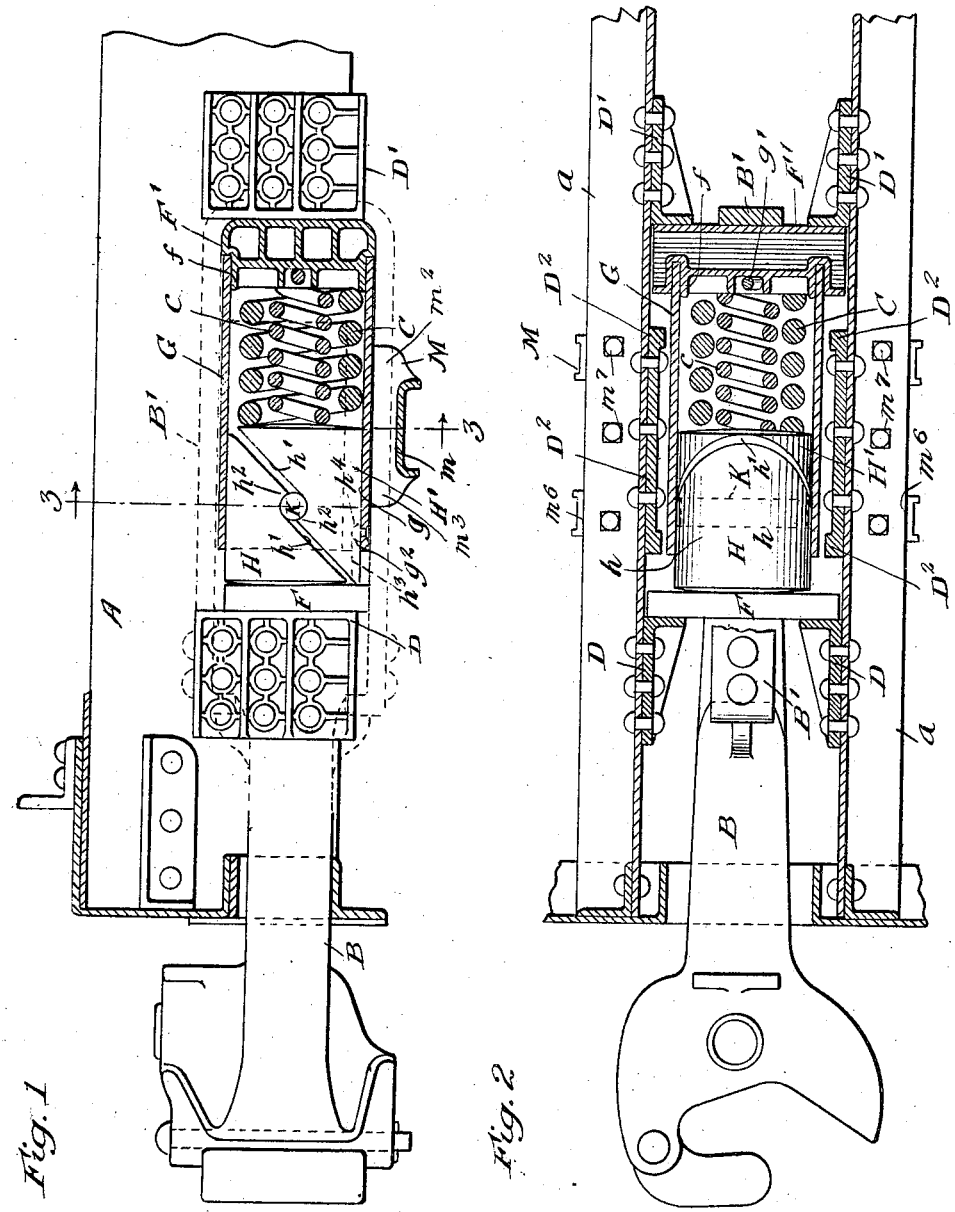

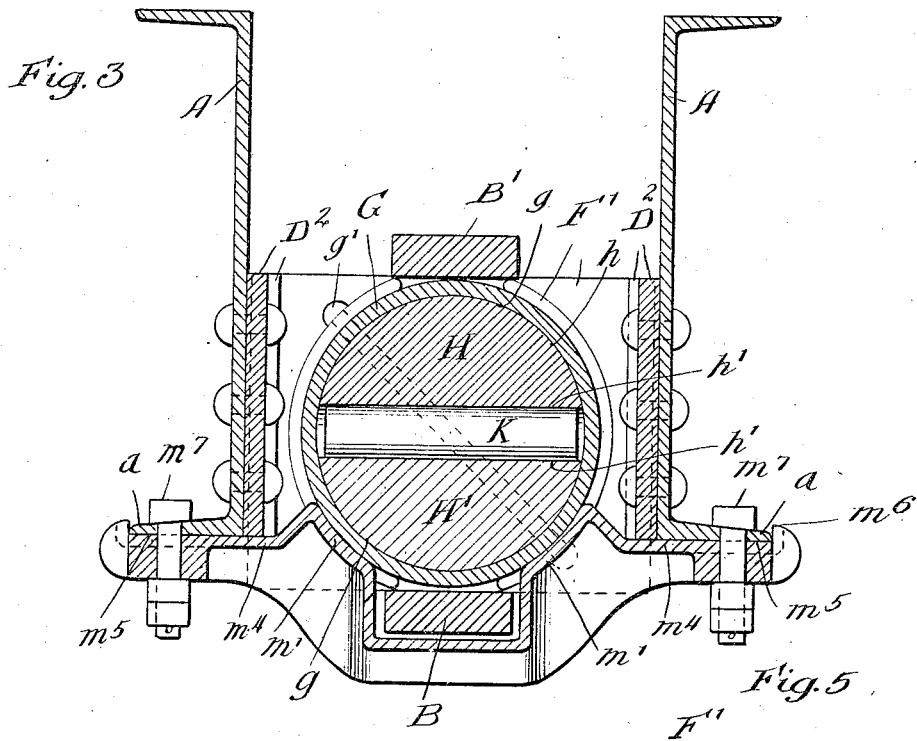
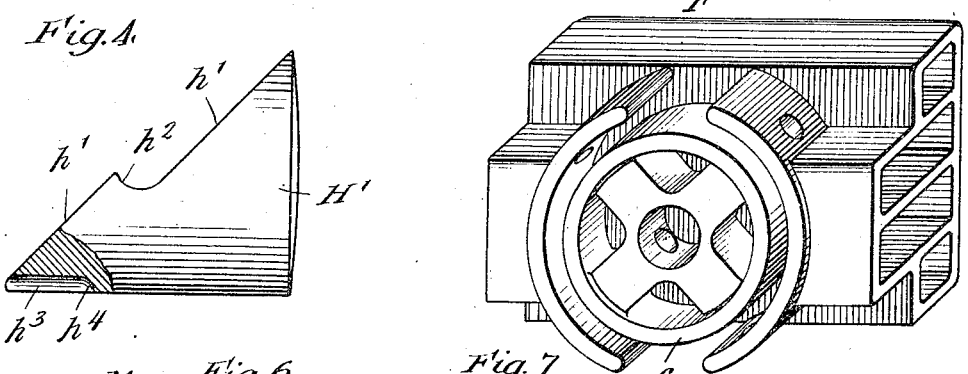

UNITED STATES PATENT OFFICE.

WILLIAM H. MINER AND JOHN F. O'CONNOR, OF CHICAGO, ILLINOIS, ASSIGNORS TO W. H. MINER COMPANY, OF CHICAGO, ILLINOIS, A CORPORATION OF ILLINOIS.

FRICTION SPRING DRAFT-RIGGING FOR RAILWAY-CARS.

No. 877,466.     Specification of Letters Patent.     Patented Jan. 21, 1908.

Application filed April 17, 1907. Serial No. 368,623.

*To all whom it may concern:*

Be it known that we, WILLIAM H. MINER and JOHN F. O'CONNOR, citizens of the United States, residing in Chicago, in the county of Cook and State of Illinois, have invented a new and useful Improvement in Friction Spring Draft-Rigging for Railway-Cars, of which the following is a specification.

Our invention relates to friction draft rigging for railway cars, and more particularly to friction draft rigging of the kind in which a longitudinally movable friction shell is employed in connection with friction blocks within the shell having inclined or wedging meeting faces to force, in connection with the spring and draw bar, the external friction faces of the friction blocks into sliding frictional engagement with the internal friction face of the friction shell, and in which an anti-friction roller is employed between the friction blocks to prevent the friction devices from sticking and consequently acting irregularly and uncertainly in cushioning the draw bar strains or blows and in releasing. Heretofore in such friction draft rigging extremely heavy blows and hammering action of the draw bar through the follower or followers against the friction shell, tends, in time, by each successive blow, to gradually upset or shorten the length of the friction shell, and thus ultimately so shorten the length of the friction shell that it will not prevent the springs from being compressed solid, thus removing their cushioning action on the friction blocks inside the friction shell and thereby causing extremely heavy blows of the draw bar against the friction blocks to burst the friction shell by lateral thrust of the friction blocks, and thus destroy the draft rigging or render inoperative, as the anti-friction roller between the friction blocks communicates or transfers the longitudinal thrust of the draw bar against the friction blocks directly to the side walls of the friction shell as soon as the upsetting or shortening of the friction shell permits the springs to be compressed solid.

The object of our invention is to provide a practical and successful means of a strong, simple, efficient and durable construction for overcoming this objection or difficulty.

Our invention consists in the means we employ for practically accomplishing this object or result; that is to say it consists, in connection with the draw bar, draw bar strap or yoke, a direct acting spring in line with the draw bar, front and rear followers, front and rear stops to engage the followers, a longitudinally movable friction shell, friction blocks within the shell, an anti-friction roller between the friction blocks, and intermediate stops on the stationary frame of the car to limit the travel or reciprocating movement of the followers, and thus relieve the friction shell from the extremely violent and hammering blows of the draw bar, tending to shorten, upset or compress the same.

Our invention also consists in the novel construction of parts and devices and in the novel combinations of parts and devices herein shown and described and more particularly specified in the claims.

In the accompanying drawing, forming a part of this specification, Figure 1 is a side elevation, partly in vertical longitudinal section of a friction spring draft rigging embodying our invention; Fig. 2 is a plan view, partly in horizontal section; Fig. 3 is a vertical cross section on line 3—3 of Fig. 1; Fig. 4 is a detail side elevation, partly in vertical section, of one of the friction blocks; Fig. 5 is a detail pespective view of the rear follower; Fig. 6 is a detail plan view of the tie plate, and Figs. 7 and 8 illustrate modifications of certain parts.

In the drawing A represents the center sills or portions of the car frame to which the draft rigging is applied, B the draw bar, $B^1$ its yoke, C c longitudinally arranged direct acting draft rigging springs, D $D^1$ front and rear stops, securely anchored to the car frame for the followers to abut against, and $D^2$ intermediate stops to limit the compression of the springs, and F and $F^1$ the front and rear followers which alternately engage the stops and coöperate with the draw bar and its yoke and the draft rigging springs.

G is a longitudinally movable friction shell, preferably cylindric in form, and having an interior friction face $g$ extending longitudinally and parallel to the line of draft.

The rear follower $F^1$ has a central cylindrical boss $f$ fitting within the rear end of the friction shell G, and to which said friction shell is rigidly secured by one or more radially extending pins or rivets $g^1$, thus securely fixing the friction shell in the rear follower. The rear follower, moving in its guides, thus prevents the friction shell from turning.

H and H¹ are longitudinally movable friction blocks having exterior friction faces $h$ in sliding frictional engagement with the interior friction face $g$ of the sliding friction shell G. These friction blocks are also furnished with inclined or wedging meeting faces $h^1$ $h^1$ which are furnished with concavely curved shoulders $h^2$ to accommodate an anti-friction roller K which is interposed between the inclined or wedging meeting faces of the friction blocks, and has a rolling contact with the inclined or wedging faces of both blocks, in order to prevent the friction blocks from sticking and consequent irregular release and action of the friction devices. One of the friction blocks, preferably the lower one H¹, is furnished with a longitudinal groove $h^3$ at its front end, engaging a projection $g^2$ on the friction shell G, preferably the head of a rivet, inserted through said shell, so that the annular shoulder $h^4$ of this groove will prevent the friction block H¹ from being entirely removed from the friction shell after the parts are once assembled. The shoulder $h^2$ on the upper friction block H, in connection with the anti-friction roller K, and the shoulder $h^2$ on the lower friction block, also prevents the upper friction block H from being removed from the shell G after the parts are assembled. By this construction and combination of parts in which the guide groove $h^3$ is open at the front end of the friction block H¹, the springs and friction blocks are all normally held and confined in and by the friction shell, so that they cannot drop out in the handling or in removing and replacing the draft rigging, after these parts have been once properly assembled together within the shell.

In assembling the friction blocks and springs within the shell the roller K is first placed between the friction blocks H H¹, and the friction blocks are inserted in the shell from the rear end thereof and slipped to the front end of the shell until the rear end of the guide groove $h^3$ engages the guide or stop $g^3$; the springs C $c$ are then inserted, and then the rear follower F¹ with its boss $f$ projecting into the rear end of the shell G is applied under suitable pressure to slightly compress the springs and then fixed in place by inserting the pins or rivet $g'$.

M is the lower tie or guide plate which supports and guides the friction shell as well as the draw bar extension or yoke B¹ and the draft rigging as a whole. This tie or guide plate is preferably furnished with a central longitudinal channel $m$ to receive the lower limb or member of the draw bar yoke, and with concavely curved guide faces $m^1$ to receive, fit and guide the friction shell G. The upright walls or faces $m^2$ $m^3$ of the draw bar yoke, channel or guide $m$, are preferably inclined or outwardly flaring from the middle portion thereof, as will be readily understood from Fig. 6 of the drawing, to permit the necessary lateral play of the draw bar when the train passes around curves.

The bottom guide or tie plate M is furnished with wings or flanges $m^4$ having seats $m^5$ and shoulders $m^6$ to receive the lower flange $a$ of the center sills or other stationary parts to which this guide or tie plate is secured by its bolts, rivets or securing devices $m^7$.

The guide slot $h^3$ and coöperating guide $g^3$ on the friction shell prevents the friction blocks from turning in the friction shell.

The intermediate stops D² which limit the travel or reciprocating movement of the followers, when combined with the friction shell and friction blocks inside the shell, and the anti-friction roller between the inclined or wedging faces of the friction blocks, prevents the extremely heavy blows and hammering action of the draw bar from coming directly upon the friction shell, and thus tending to upset or shorten the same, so that the springs can then be compressed solid, and thus causing the two wedging friction blocks inside the shell to burst it.

In the modification illustrated in Fig. 7 the front, rear and intermediate stops are shown as made in one piece.

In the modification shown in Fig. 8 the rear follower is shown as made integral with the friction shell.

We claim:

1. In a friction draft rigging, the combination with the draw bar, spring and followers, of front, rear and intermediate stops, a friction shell, friction blocks within the shell having inclined meeting faces, and an anti-friction roller between said friction blocks, substantially as specified.

2. In a friction draft rigging, the combination with the draw bar, stops and spring and front and rear followers, of a longitudinally movable cylindric friction shell having an inside friction face, a pair of coöperating friction blocks having cylindric friction faces and inclined meeting faces, an anti-friction roller interposed between said wedging meeting faces and having a rolling action on both said blocks, said rear follower having a central boss fitting within the rear end of said friction shell, substantially as specified.

3. In a friction draft rigging, the combination with the draw bar, stops and spring and front and rear followers, of a longitudinally movable cylindric friction shell having an inside friction face, a pair of coöperating friction blocks having cylindric friction faces and inclined meeting faces, an anti-friction roller interposed between said wedging meeting faces and having a rolling action on both said blocks, said rear follower having a central boss fitting within the rear end of said friction shell, and a pin extending through said friction shell and the boss of said follower to secure said parts together, substantially as specified.

4. In a draft rigging, a tie or guide plate M having shouldered wings or flanges furnished with seats to engage the bottom flanges of the center sills and provided with a longitudinal guide channel for the lower member of the draw bar yoke, and with curved guide faces for the friction shell, substantially as specified.

5. In a friction draft rigging, the combination with a friction shell, of a spring therein, friction blocks within the shell, one of said friction blocks being furnished with a longitudinal guide groove open at the front end thereof, a guide or stop secured to the friction shell and fitting in said guide groove to hold the friction blocks and springs within the shell in assembled position, and a follower secured to the rear end of said friction shell, substantially as specified.

6. In a friction draft rigging, the combination with a friction shell, of a spring therein, friction blocks within the shell, one of said friction blocks being furnished with a longitudinal guide groove open at the front end thereof, a guide or stop secured to the friction shell and fitting in said guide groove to hold the friction blocks and spring within the shell in assembled position, and a follower secured to the rear end of said friction shell, said follower having a central boss fitting within said shell, substantially as specified.

7. In a friction draft rigging, the combination with the draw bar, front and rear draft rigging stops and spring, of friction devices including friction blocks having inclined faces and a friction member inclosing said blocks, and intermediate stops to limit the travel of the draw bar and prevent the spring from being compressed solid, substantially as specified.

WILLIAM H. MINER.
JOHN F. O'CONNOR.

Witnesses:
H. M. MUNDAY,
PEARL ABRAMS.